3,063,854
PAPER COATING COMPOSITION

Arlie W. Claxton, Scotch Plains, N.J., assignor to Minerals & Chemicals Philipp Corporation, a corporation of Maryland
No Drawing. Filed Nov. 18, 1959, Ser. No. 853,694
16 Claims. (Cl. 106—213)

The subject invention relates to the art of coating paper stock with kaolin clay to improve the finish and printability of the stock and relates, more particularly, to an improved paper coating composition. The paper coating composition of the present invention is designed to form on the base stock a smooth level uniform surface which is visually free from mottling or roughness and which has superior gloss and ability to register accurately printed images, as compared with kaolin coating colors prepared in accordance with the teachings of the prior art.

Kaolin clay is the principal pigment conventionally used to coat paper stock. The clay is applied in the form of an aqueous paste (called a "coating color") which comprises, in addition to the clay, an adhesive, usually amylaceous or casein, to bind the clay particles to the base sheet. Other pigments such as calcium carbonate and titania may be used in conjunction with the clay. Also special purpose additives such as waxes and soaps may be used. Two of the principal factors influencing smoothness and printing characteristics of the coated sheet are the rheological properties of the coating color, which affect the smoothing of the coating color when it is applied to the base stock, and the orientation of pigment particles on the paper substrate to form a more or less continuous pigment surface on the paper.

It is a principal object of my invention to provide a coating composition containing kaolin clay, which composition is of a character such that paper coated therewith has improved gloss and printing characteristics, and the coating color has viscosity characteristics such that it has improved leveling properties when coated on base stock, as by roll coating machines.

A more specific object of my invention is the provision of a kaolin clay coating color formulated with an amylaceous adhesive and containing a novel additive which represents a substantial improvement over prior art coating compositions employing the same clay in terms of gloss and printing qualities of paper coated therewith.

A further object of my invention is to provide coated lightweight publication grade paper having outstanding gloss and capable of accurately registering halftone printed images.

Other objects and advantages will be apparent to those skilled in the art.

I have discovered a simple inexpensive method by means of which the leveling properties, gloss and printing properties of clay coated paper stock may be materially improved.

Briefly stated, the present invention contemplates the addition of a small quantity of certain alkylene or polyalkylene polyamines, hereafter set forth, to an otherwise conventional kaolin clay coating color formulated with an amylaceous adhesive. Although coating color compositions of my invention contain as essential ingredients: water, kaolin clay, an amylaceous adhesive for said clay, and a polyamine, it will be distinctly understood that other materials commonly used in aqueous starch-based kaolin clay coating colors are included within the scope of the coating color compositions as described and claimed herein.

I have found that paper stock coated with the novel coating color of the present invention has printing qualities, particularly clarity of printing, absence of mottling and continuity of ink surface, superior to the same stock coated with a like coating color formulated with the same grade of kaolin clay but with no polyamine additive. Moreover, the coating color formulated with polyamine has a higher viscosity at a given solids concentration than a like coating color in the absence of polyamine and is more thixotropic than the coating color formulated without the novel additive. As a result of this, the coating color formulated with polyamine has better leveling properties, particularly when the coating color is applied by a roll coater machine. The higher gloss of a sheet coated with the coating color of the present invention permits the coated sheet to be calendered less severely than would normally be possible, with the result that an improvement in the quality of the coated paper may be realized.

I do not wish to be bound to any theory for the unusual and surprising results that I realize by the inclusion of the polyamine in the coating color. Microscopic studies indicate that the polyamine influences favorably the orientation of the kaolin pigment in the coated film in a manner such that the kaolin platelets tend to bridge crevices in the fibrous substrate rather than follow the contour of the crevice. The result of such orientation would be expected to be a finish on the coated stock which is smoother and thus permits more accurate registration of printed images.

Paper stock coated with kaolin clay coating colors formulated with polyamine has less show-through of printing ink on the reverse side of the coated sheet than a conventional coating color, although the sheet tends to pick up more ink. A possible explanation for this phenomenon is that the polyamine additive may form a coating on clay particles present on the surface of the coated sheet with the result that the organic components of the polyamine will facilitate and improve wetting of the normally hydrophilic pigment by the organic printing ink vehicle.

It is interesting that the outstanding results I realize through the use of the alkylene polyamines in the coating color are not realized by the use of lower aliphatic amines as a class, and the presence of at least two strongly basic groups in the amine is apparently necessary. For example, monobasic amines, even those which are strongly basic, such as for example diethylamine, or alkanolamines, such as diethanolamine, do not provide the desired results and are outside the scope of my invention.

An instance in which the improved coating color of the present invention is particularly useful and wherein outstanding economic advantages are realized is in the production of lightweight quality magazine stock adapted for printing with heat-set ink by halftone printing techniques. Recently the publication industry has accepted coated stock of a lower weight than formerly used in order to cope with increased charges for mailing publications. In preparing such coated stock, lighter coat weights are employed than have been used in preparing heavier coated stock. To realize equivalent printing characteristics utilizing a lower weight coated stock, either the base stock or coating color must be improved. It is impossible for many paper coaters to improve the base stock, the quality of which is controlled to a large extent by the character of the fiber. Thus, an improvement in the coating color must be accomplished to provide equal printing characteristics in lighter weight coated stock.

Although one instance of the utility and advantage of the novel coating composition of my invention has been set forth above, it will be obvious that improving the coating clay of any coated sheet is a valuable and important contribution to the art.

My invention is not limited to any procedure for preparing the improved kaolin clay coating color including alkylene polyamine since a variety of methods are suitable. Preferably, the polyamine is incorporated in an otherwise finished coating color in the form of a dilute aqueous dispersion or solution. For example, I have obtained excellent results by slurrying clay in water containing a deflocculating agent such as, for example, sodium silicate or tetrasodium pyrophosphate, unless the clay has been pretreated with an appropriate deflocculating agent, adding a suitable adhesive solution in the conventional manner, and then uniformly incorporating a dilute aqueous solution of the polyamine into the mixture. The coating stock is applied to the base stock in the usual manner and then dried and calendered in accordance with methods well-known to those skilled in the art. If desired, the procedure may be varied. For example, the clay may be precoated with the polyamine prior to its incorporation in the formulation.

The polyamines I employ in accordance with the present invention are alkylene polyamines (including polyalkylene polyamines) of the general formula:

$$R_3,R_4N(R_1NH)_nR_2NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms, and $n$ is an integer from 0 to 8.

Because of their commercial availability and outstanding performance, I prefer to use the lower members of the nonalkylated ethylene amine series, i.e., ethylene amines having two primary amine groups and from zero to three secondary amine groups. In the lower ethylene amine series, $R_1$ and $R_2$ in the above formula are ethylene groups and $n$ is an integer from 0 to 3. Thus, the preferred nonalkylated ethylene amines have the general formula:

$$NH_2(CH_2CH_2NH)_nCH_2CH_2NH_2$$

wherein: $n$ is an integer from 0 to 3. Species encompassed within the group of preferred ethylene amines, listed in order of ascending value of $n$ are: ethylenediamine, diethylenetriamine, triethylenetetramine and tetraethylene pentamine. Pentaethylene hexamine ($n=4$) heptaethylene octamine ($n=6$) and nonaethylene decamine ($n=8$) are not presently available commercially but should be as satisfactory as the lower ethylene amines cited above. When the pH of the coating color is 8.0 or more I prefer to employ ethylenediamine and diethylenetriamine rather than higher members of the ethylene amine series, since these species of ethylene amines appear to produce more marked benefits at the higher pH levels.

As examples of other alkylene polyamines within the compass of the general formula of alkylene polyamines and polyalkylene polyamines set forth above are propylenediamine and other propylene amines, mixed trimethylene-ethylene amines, such as $$NH_2(CH_2)_2NH(CH_2)_3NH(CH_2)_2NH_2$$

as well as lower alkyl derivatives of any of the aforementioned alkylene polyamines such as, for example, N,N-dimethylamino-propylamine and N,N-diethylaminopropylamine. Each of the aforementioned aliphatic polyamines contains at least two highly basic amine groups. It will be noted that hexamethylene tetramine, despite its name, is not an alkylene polyamine. Hexamethylene tetramine functions as a weak monobase, unlike the polyamines above set forth, and is not useful in the practice of the present invention.

The aforementioned alkylene polyamines may be incorporated in the composition in the form of free bases or may be added to the composition in the form of a water-soluble salt, such as chloride, acetate, phosphate, etc. The state of the polyamine in the coating color, i.e., whether as a free base, salt or partial salt, will be determined by the pH of the coating color.

The kaolin clay I employ is a paper coating grade which ordinarily is a white, very finely divided, grit-free material. Good results have been realized using a clay having a particle size distribution such that at least about 70 percent, and preferably about 80 to 90 percent, by weight of the particles thereof have the water sedimentation characteristics of particles 2 microns or finer. The invention is not limited to the use of clay of such particle size.

For economic reasons I prefer to employ a domestic kaolin clay, such as one mined in Georgia, Florida or Texas, and which has been degritted and fractionated, as by hydraulic classification, to a particle size range set forth above. The clay may be bleached by methods well-known to those skilled in the art or may be otherwise processed to improve specific properties such as brightness. English kaolin, which is chemically similar to domestic kaolin should also be useful in the practice of my invention. English kaolin has a higher content of illitic impurity and has a higher surface area than Georgia kaolin of similar particle size distribution.

The amount of polyamine I employ is small, being only a fraction of the weight of the clay. The exact range of suitable quantities and optimum quantity of polyamine for any specific coating color formulation will vary with the character of the clay, particularly the surface area of the clay, and with the molecular weight of the alkylene polyamine, and is readily determined experimentally by observation of the characteristics of a sheet coated with the formulation. In general, it may be said that the alkylene polyamine is dispersed in the coating color in amount sufficient to increase the viscosity of the coating color over that of an identical coating color in the absence of the polyamine. The upper limit of polyamine content in the coating color is dictated by economic considerations as well as by the flow properties desired in the coating color and will not be so great as to produce a coating color which is too viscous to apply to the paper sheet. Typically, the polyamine will be used in an amount within the range of about 0.025 to about 5.0 percent and, more usually, 0.10 to 1.0 percent, based on the moisture free weight of the clay. Moisture free clay weight is determined by heating the clay to constant weight at 220° F.

I may use kaolin clay as the sole pigment, mixing various grades for economic reasons or to achieve desired gloss characteristics. However, I may add other pigments when special surface effects are required of the coated stock. For example, I may add whiting to the kaolin, typically in an amount of about 15 percent, based on the total pigment weight. Other pigments I may use in combination with the kaolin include satin white and titania.

The adhesive I employ is any water-soluble or dispersible amylaceous adhesive used by the paper coating industry, such as hypochlorite oxidized starch, dextrinized starch, epoxide modified starch, enzyme converted starch, etc. If desired, a mixed adhesive such as an amylaceous-synthetic latex (usually butadiene-styrene latex) or amylaceous-casein mixture may be employed; in such a case the amylaceous adhesive will constitute at least 50 percent of the total adhesive weight (dry basis). I have found that the use of the aforementioned alkylene polyamines in a coating color containing casein as the sole adhesive does not produce the desired change in rheology of the coating color and does not improve the printing qualities of the coated stock as when an amylaceous adhesive is employed.

The pH of the coating color may vary within a relatively wide range, although coating colors are most usually applied at a pH within the range of from about 7 to 10.

The clay will usually be used in amount between about 25 percent and about 65 percent, based on the total composition weight and the adhesive in amount between about 5 percent and about 30 percent by weight, same basis. The total solids content of the composition will vary considerably with the type of coating equipment to be used. Particularly good results have been realized when the polymaine additive is employed in a coating color having a high clay solids content, i.e., a coating color in which the clay content is about 45 percent or more of the total composition weight.

In most instances the finish of the coated sheet will be improved by the incorporation in the coating color of a small amount of waxy substance or soap such as, for example calcium stearate, as is well-known to those skilled in the art.

The following examples are given only for the sake of illustrating certain embodiments of my invention and are not to be construed as limiting the spirit and scope thereof.

EXAMPLE I

Following is an illustration of my invention applied to the provision of improved lightweight magazine stock. This example illustrates the improvement in the printing properties of coated stock that is achieved by my novel coating composition.

Various coating colors were formulated to coat 27 pound basic weight stock (essentially a sulfite groundwood base stock) with an appropriate quantity of coating to realize a 40 pound per ream (3300 sq. ft.) coated paper suitable for use in a high grade pictorial magazine.

Coating color formulations were prepared with and without an ethylenediamine additive at various solids levels, the formulations being otherwise substantially identical. Also prepared for purposes of comparison was a coating color employing a high grade English kaolin clay. The basic formulation (exclusive of the diamine content) is typical of a coating color commercially used in coating stock for a popular weekly pictorial magazine. The coated sheets were dried and calendered in the conventional manner and the printing qualities measured by an ink holdout test evaluating ink absorption and show-through. Also measured was gloss which is related to surface smoothness of the coated sheet.

In preparing the coating colors, relatively high solids content (65 percent to 71 percent solids) clay water slurries were prepared using various kaolin clays hereafter described. In the case of predispersed clays (which had been spray dried in the presence of 0.35 percent, by weight of tetrasodium pyrophosphate), no deflocculant was added. When nonpredispersed clays were employed, tetrasodium pyrophosphate was added to the water before addition of clay in the amount of 0.35 percent, based on the dry clay weight.

Those coating colors formulated with ethylenediamine were prepared in the same manner except that ethylenediamine of high purity and in the amount of 0.25 percent, based on the dry weight of the clay, was dissolved in the water prior to slurrying of the clay therein.

Five percent Nopco ESI, based on the dry weight of the starch, was mixed into each clay water slurry; Nopco ESI, a 50 percent solids calcium stearate dispersion, is supplied by Nopco Chemical Company.

A solution of precooked solubilized medium viscosity hypochlorite oxidized cornstarch was added to each of the various clay slurries and water added in quantity sufficient to yield the desired total solids content. The various formulations were adjusted to a pH of 8.5 by addition of caustic soda. The clay to starch ratio (dry basis) in the various formulas was 100 to 18. Starch solutions were prepared by cooking starch and distilled water in a steam bath to a temperature of 180° F., followed by immediate slow cooling to 110° F. for use. Solids content of the starch solutions as prepared was 27 percent.

The various clays are identified as follows: kaolin clay A is predispersed Spray Satin, a water-washed, hydraulically classified kaolin mined near McIntyre, Georgia, and supplied by Minerals & Chemicals Corporation of America. The clay is processed by spray drying a slurry of clay deflocculated with tetrasodium pyrophosphate and has a particle size distribution such that 92 percent is 2 microns or finer, and 44 percent is 0.5 micron or finer (as measured by a soil hydrometer technique using 2.58 as the value of particle density). The specific surface of clay A, as measured by nitrogen adsorption, is 15 square meters per gram. The free moisture content of Spray Satin is about 0.2 percent. Kaolin clay B is an English kaolin. The particle size of clay B is 80 percent finer than 2 microns and 30 percent finer than 0.5 micron, as measured by soil hydrometer technique. The specific surface of clay B is about 20 square meters per gram, as measured by nitrogen adsorption.

All coating of paper was done on a Vandercook proof press. A smooth copper-clad, lead-base plate, 8 inches by 12 inches, was placed in the printing bed of the Vandercook proof press. An excess of coating color was applied to the leading edge of this plate with a spatula. The coating roll, to which was fastened the 11 x 17-inch sheet of paper to be coated, was then rolled over the coating plate. The excess coating was squeezed out the side and the end of the coating plate and the coated sheet was removed and allowed to dry to equilibrium moisture content. Coat weight was controlled by exerting controlled pressure on the coating plate with the coating roll. Coat weight was kept within the range of 6.5 to 7.0 pounds per side per ream.

The coated sheet was prepared and conditioned under conditions of 50 percent relative humidity ±2 percent and at 73° F.±2° F., TAPPI standard conditions for paper testing.

Each coated sheet, after conditioning, was calendered on a Wheeler supercalender through four nips at a pressure of 750 pounds per linear inch (15 pounds' gauge pressure).

Gloss values were obtainer with the Hunter reflectometer, using the 75° head.

Summarized below in Table I are the results obtained by coating the base stock with various coating color formulations.

*Table 1*

EFFECT OF ADDITION OF ETHYLENEDIAMINE TO A KAOLIN COATING COLOR

| Clay | Percent Solids In Coating Color | Ethylenediamine, Percent Based on Clay Wt. | Gloss |
|---|---|---|---|
| Kaolin A | 54 | 0.25 | 35.1 |
| Do | 52 | 0.25 | 36.3 |
| Do | 50 | 0.25 | 38.2 |
| Do | 48 | 0.25 | 39.6 |
| Kaolin B | 50 | None | 35.4 |

The results illustrated in Table I show that the gloss of a coating formulated with clay A was materially improved by inclusion of the small quantity of ethylenediamine in the coating color, thus indicating a smoother coating. The results further show that clay A, normally inferior to clay B with respect to gloss value, was about equal to or superior to clay B when formulated with ethylenediamine at various solids levels.

The coated sheets prepared with coating colors containing kaolin clay A were compared for ink absorption and show-through by observing the inked surfaces of the paper, as well as comparing the extent of ink visible on the reverse side of the coated sheet. An excess of heavy bodied black pigmented polybutene printing ink was applied to a small section of coated paper. As soon as possible after application, the ink was wiped off with wiping tissue and wiping was continued until no ink came off on the wiping tissue. Samples were individually treated. One individual made all the ink tests and an effort was made to reproduce accurately the pressures involved in wiping and the time elements. The same relative area of each coated sheet was used and evaluations were made on three sheets.

The reverse side of the sheet coated with the control coating color showed considerable ink show-through; the sheets coated with compositions formulated with polyamine had little show-through and substantilly no ink pigment had penetrated through the sheets. It was readily apparent that more ink was absorbed by the sheet coated with a formulation in which the polyamine was omitted. These observations indicate that paper coated with the coating color containing the polyamine picked up equal amounts of ink but kept more of the pigment portion of the ink on the paper surface.

Comparable results will be realized substituting diethylenetriamine and other alkylene polyamines for the ethylenediamine of the example.

EXAMPLE II

The effect of adding diethylenetriamine in varying concentrations to a conventional kaolin coating color was investigated and the properties of paper stock coated to the same coated weight with the various coating color formulations of my invention were compared with the properties of the same stock coated to the same coat weight with a like koalin coating color in the absence of polyamine additive. The results are tabulated in Table II.

The various coating colors identified in Table II were prepared in accordance with the procedure outlined under Example I, utilizing, however, essentially pure diethylenetriamine in lieu of ethylenediamine and employing a coarser grade of domestic kaolin (kaolin C). Kaolin C is a Georgia kaolin clay which is predispersed with tetrasodium pyrophosphate and has the following characteristics: pH 6.6; particle size distribution, 92 percent finer than 5 microns, 80 percent finer than 2 microns and 60 percent finer than 0.8 micron; percent moisture, 0.2 percent. The starch was the same used in Example I and, as in that example, the dry clay to starch weight ratio was 100 to 18. The same 27 pound basis weight stock used Example I was coated with the various coating colors to a coat weight of 6.5 pounds per ream per side. Coating technique and evaluations were those described in the previous example.

*Table II*

EFFECT OF ADDITION OF DIETHYLENETRIAMINE TO A KAOLIN COATING COLOR

| Clay | Percent Solids | Percent Diethylenetriamine Based on Clay Weight | Gloss | pH |
|---|---|---|---|---|
| Kaolin C | 54.5 | None | 37.8 | 8.6 |
| Do | 53.2 | 0.1 | 38.9 | 8.6 |
| Do | 50.8 | 0.2 | 39.6 | 8.6 |
| Do | 48.2 | 0.3 | 38.6 | 9.6 |

The results tabulated in Table II indicate that several significant benefits are realized by inclusion of the diethylenetriamine in the coating color. Firstly, it is evident that at the same coat weight formulations including diethylenetriamine had higher gloss. Another and very valuable benefit of adding the polyamine to the coating color, that is illustrated by these results, is that lower solids levels are able to provide the same coat weight. For reasons not determined it is observed that at a given coat weight, coating with lower solid levels coating colors improves the smoothness of the coating.

Also seen is that in the particular formulation used there appears to be an optimum diethylenetriamine content, viz., 0.2 percent, based on the clay weight.

EXAMPLE III

Coating colors were formulated with ethylenediamine, diethylenetriamine, triethylenetetramine and tetraethylenepentamine and the rheology of the various coating colors was studied at various pH levels.

The coating colors were formulated by preparing a clay slip using 125 parts by weight of kaolin clay, 0.3 part by weight tetrasodium pyrophosphate and 86.6 parts by weight distilled water. 83.4 parts by weight of a cool 27 percent cooked hypochlorite oxidized cornstarch solution (113 parts by weight starch, 257 parts by weight water) was added to the clay slip and stirred. To fractions of the above, various alkylene polyamines were added in the amount of 0.05 percent, 0.10 percent and 0.15 percent, based on the weight of kaolin clay present. The rheology of the these samples was investigated with a Hagan viscometer at pH values of 6, 7, 8, 9 and 10, using a 15 percent HCl solution or a 10 percent NaOH solution to make the appropriate pH adjustment.

It was found that in each case the addition of tetraethylenepentamine, triethylenetetramine, diethylenetriamine or ethylenediamine increased the viscosity and thixotropic character of a coating color from what it would be in the absence of a polyamine, with the degree of thixotropy of the system dependent on the amount of polyamine used and being in the following ascending order; tetraethylenepentamine, triethylenetetramine, diethylenetriamine and ethylenediamine. It was also found that the effects of the polyamines were more pronounced at lower pH values.

EXAMPLE IV

The 27 pound basis paper stock of Example I was coated with the kaolin clay coating color formulations of Examples I and II, containing 0.2 percent ethylenediamine and diethylenetriamine, respectively. All coating was done on a bench-type trailing blade coater, the principle of which is described in U.S. 2,368,176 to A. R. Trist. Coat weight was kept within the range of 6.5 to 7.0 pounds per side per ream.

Printing was done on a letter press proofpress using halftone printing plates. The press and printing procedure employed are detailed in a publication of IPI entitled "Testing Printability of Paper and Board With Ink—III" (November 1957) by Otto P. Berberich.

The printed sheets were characterized by outstanding continuity of ink surface, clarity and absence of mottling. The print showed less show-through of ink, particularly in the areas of the sheet where dark printed images were made, than a printed sheet coated with a control coating color which was formulated without the polyamine.

EXAMPLE V

A coating color of the present invention was formulated, using a typical starch coating color which did not contain a wax or soap additive.

A 5 percent solids clay-water slurry was prepared using a Georgia kaolin clay (kaolin clay A). A 27 percent solids solution of precooked solubilized medium viscosity hypochlorite oxidized cornstarch was added to the clay-water slurry together with water to bring the total solids content of the slurry to about 48 percent. The weight ratio of dry clay to dry starch was 100 to 18. The starch solution was prepared by cooking the cornstarch and distilled water in a steam bath until the temperature of the starch reached 190° F., following which the solution was immediately cooled to 100° F. for use.

Diethylenetriamine was added to portions of the starch-clay slurry in amount to supply 0.05 and 0.10 percent diethylenetriamine, based on the weight of the clay, moisture free basis. Viscosity at various rates of shear was determined with a Brookfield viscometer. The results reported in Table III illustrate the increase in viscosity of coating colors containing very small quantities of diethylenetriamine.

Table III

COMPARISON OF VISCOSITY OF KAOLIN COATING COLORS PREPARED WITH AND WITHOUT POLYAMINE SOAP ADDITIVE

| Formula | Percent Solids | Diethylenetriamine, Percent Based on Wt. of Clay (Moisture Free Clay Basis) | Brookfield Viscosity | |
|---|---|---|---|---|
| | | | R.p.m. | Cps. |
| Control | 48.2 | None | 10 | 1,680 |
| | | | 20 | 1,080 |
| | | | 50 | 604 |
| | | | 100 | 440 |
| Diethylenetriamine | 48.0 | 0.05 | 10 | 2,440 |
| | | | 20 | 1,510 |
| | | | 50 | 816 |
| | | | 100 | 524 |
| Do | 48.3 | 0.10 | 10 | 4,220 |
| | | | 20 | 3,190 |
| | | | 50 | 2,036 |
| | | | 100 | 1,468 |

EXAMPLE VI

This example illustrates the improvement in gloss that is obtained by incorporating only 0.05 percent diethylenetriamine (based on moisture free clay weight) in the wax and soap free starch coating color of the previous example.

Twenty-seven pound basic weight sulfite groundwood stock was coated on a bench model trailing blade coater with sufficient of the 48.0 percent clay solids coating color to provide 40 pounds per ream (3300 sq. ft.) coated paper. The coated sheet was prepared and conditioned under conditions of 50 percent relative humidity ±2 percent and at 73° F.±2° F.

The gloss of paper coated with the coating color containing 0.05 percent diethylenetriamine was 23.7, an improvement over that of the paper coated with a control color containing no polyamine which had a gloss value of 22.2.

EXAMPLE VII

Other coating color formulations of my invention are tabulated below:

| Parts By Weight | | | Percent Polyamine, Based On Clay Weight |
|---|---|---|---|
| Kaolin Clay Predispersed With 0.35% By Wt. of Tetrasodium Pyrophosphate | 28% Solids Solution | H₂O | |
| 300 | a150 | 257 | 0.25% Tetraethylene-pentamine. |
| 300 | b193 | 247 | 0.30% Triethylene,tetramine Monoacetate. |
| 300 | b172 | 288 | 0.50% Ethylenediamine Diacetate. |
| 300 | c193 | 207 | 0.10% N,N-dimethyl Aminopropylamine. | a Hydroxyethylated cornstarch.
b Hypochlorite oxidized cornstarch.
c Enzyme converted tapioca starch.

EXAMPLE VIII

Still another composition of my invention is formulated as follows:

| | Parts by wt., dry basis |
|---|---|
| Kaolin clay | 300 |
| Stach | 36 |
| Butadiene-styrene | 18 |
| Water | 280 |
| Calcium stearate | 1.5 |

To the above add 3.0 parts by weight of a 10 percent aqueous solution of diethylenetriamine.

EXAMPLE IX

Another composition of the invention is as follows:

| | Parts by wt., dry basis |
|---|---|
| Kaolin clay | 300 |
| Starch | 30 |
| Casein | 2 |
| Butadiene-styrene latex | 15 |
| Water | 350 |

To the above add 4.0 parts by weight of a 10 percent aqueous solution of diethylenetriamine.

While I have described certain methods of practicing my invention, it is to be distinctly understood that the invention is not limited thereto but may otherwise be variously practiced within the scope of the following claims.

This application is a continuation-in-part of copending U.S. patent applications, Serial No. 763,181, filed September 25, 1958, and Serial No. 806,456, filed April 15, 1959, now abandoned.

I claim:

1. A composition for coating paper to improve the printing characteristics thereof which comprises water having dispersed therein an amylaceous adhesive, kaolin clay and a small amount of a polyamine material selected from the group consisting of alkylene polyamines, mineral acid and acetic acid salts thereof, said alkylene polyamine having the general formula:

$$R_3, R_4 N(R_1 NH)_n R_2 NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8, said alkylene polyamine being present in amount such that the viscosity of said composition is substantially higher than the viscosity of a like composition in the absence of said polyamine material.

2. The composition of claim 1 wherein said alkylene polyamine is a material of the structural formula:

$$NH_2(CH_2CH_2NH)_n CH_2CH_2NH_2$$

wherein: $n$ is an integer from 0 to 3.

3. A composition for coating paper to improve the printing characteristics thereof which comprises water having dispersed therein an amylaceous adhesive, kaolin clay and a small amount of ethylenediamine, sufficient to increase the viscosity of said composition to an amount substantially greater than that of a like composition in the absence of said ethylenediamine.

4. A composition for coating paper to improve the printing characteristics thereof which comprises water having dispersed therein an amylaceous adhesive, kaolin clay and a small amount of diethylenetriamine, sufficient to increase the viscosity of said composition to an amount substantially greater than that of a like composition in the absence of said diethylenetriamine.

5. A coating color adapted for application to paper stock to improve the printing characteristics of said stock which comprises an aqueous dispersion of an adhesive consisting of at least a major weight proportion of amylaceous material, and incorporated therein, kaolin clay and from about 0.025 to about 5.0 percent, based on the moisture free weight of said clay, of an alkylene polyamine of the general formula:

$$R_3, R_4 N(R_1 NH)_n R_2 NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8.

6. The composition of claim 5 wherein said alkylene polyamine is a material of the structural formula:

$$NH_2(CH_2CH_2NH)_n CH_2CH_2NH_2$$

wherein: $n$ is an integer from 0 to 3.

7. A coating color adapted for application to paper stock to improve the printing characteristics of said stock which comprises an aqueous dispersion of an adhesive consisting of at least a major weight proportion of amylaceous material, and incorporated therein, kaolin clay and from about 0.025 to about 5.0 percent, based on the moisture free weight of said clay, of ethylenediamine.

8. A coating color adapted for application to paper stock to improve the printing characteristics of said stock which comprises an aqueous dispersion of an adhesive consisting of at least a major weight proportion of amylaceous material, and incorporated therein, kaolin clay and from about 0.025 to about 5.0 percent, based on the moisture free weight of said clay, of diethylenetriamine.

9. In the preparation of a coating color adapted for application to paper stock to improve the printability thereof and involving incorporating kaolin clay in an aqueous dispersion of an adhesive consisting of at least a major weight proportion of amylaceous material, the improvement which consists essentially in incorporating in said coating color, prior to its application to paper stock, from 0.025 to 5.0 percent, based on the moisture free weight of said clay, of a polyamine selected from the group consisting of alkylene polyamines and mineral acid, and acetic acid salts thereof, said alkylene polyamine having the general formula:

$$R_3,R_4N(R_1NH)_nR_2NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8.

10. In the preparation of a coating color adapted for application to paper stock to improve the printability thereof and involving incorporating kaolin clay in an aqueous dispersion of an adhesive consisting of at least a major weight proportion of amylaceous material, the improvement which consists essentially in incorporating in said coating color, prior to its application to paper stock, from 0.025 to 5.0 percent, based on the moisture free weight of said clay, of ethylenediamine thereby to increase the viscosity of the coating color over that of a like coating color in the absence of said ethylenediamine.

11. In the preparation of a coating color adapted for application to paper stock to improve the printability thereof and involving incorporating kaolin clay in an aqueous dispersion of an adhesive consisting of at least a major weight proportion of amylaceous material, the improvement which consists essentially in incorporating in said coating color, prior to its application to paper stock, from 0.025 to 5.0 percent, based on the moisture free weight of said clay, of diethylenetriamine thereby to increase the viscosity of the coating color over that of a like coating color in the absence of said diethylenetriamine.

12. Paper stock having a surface coating comprising kaolin clay, an adhesive consisting of at least a major proportion of amylaceous material, and from about 0.025 to 5.0 percent, based on the moisture free weight of said clay, of a material selected from the group consisting of alkylene polyamines, mineral acid and acetic acid salts thereof, said alkylene polyamine having the general formula:

$$R_3,R_4N(R_1NH)_nR_2NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8.

13. Paper stock having a weight of about 27 pounds per side per ream and coated on each surface of said paper in the amount of about 6½ pounds per side per ream, a coating color comprising kaolin clay, an adhesive comprising at least a major weight proportion of amylaceous material, and from about 0.025 to about 5.0 percent, based on the moisture free weight of said clay, of an ethylene amine of the general formula:

$$NH_2(CH_2CH_2NH)_nCH_2CH_2NH_2$$

wherein: $n$ is an integer from 0 to 3.

14. A composition for coating paper to improve the printing characteristics thereof which consists essentially of water having dispersed therein kaolin clay in amount within the range of about 25 percent to about 65 percent of the composition weight, cornstarch adhesive in amount within the range of about 5 percent and about 30 percent of the composition weight and from 0.1 to 1.0 percent, based on the moisture free weight of said clay, of an amine of the general formula:

$$R_3,R_4N(R_1NH)_nR_2NH_2$$

wherein: $R_1$ and $R_2$ are alkylene groups having from 2 to 3 carbon atoms, $R_3$ and $R_4$ are selected from the group consisting of hydrogen and alkyl groups having from 1 to 2 carbon atoms and $n$ is an integer from 0 to 8.

15. The composition of claim 5 wherein said alkylene polyamine is present in amount of from about 0.1 to 1.0 percent, based on the moisture free weight of said clay.

16. The composition of claim 1 which also contains a small amount of calcium stearate.

References Cited in the file of this patent

UNITED STATES PATENTS

| | | |
|---|---|---|
| 2,248,636 | Marsden | July 8, 1941 |
| 2,885,374 | Sweeney | May 5, 1959 |
| 2,892,731 | Claxton | June 30, 1959 |
| 2,899,330 | Lyons | Aug. 11, 1959 |

UNITED STATES PATENT OFFICE
CERTIFICATE OF CORRECTION

Patent No. 3,063,854                        November 13, 1962

Arlie W. Claxton

It is hereby certified that error appears in the above numbered patent requiring correction and that the said Letters Patent should read as corrected below.

Column 7, line 40, after "used" insert -- in --; column 8, line 56, for "5 percent" read -- 65 percent --; column 9, line 36, after "control" insert -- coating --.

Signed and sealed this 23rd day of April 1963.

SEAL)
Attest:

ERNEST W. SWIDER
Attesting Officer

DAVID L. LADD
Commissioner of Patents